US009785558B2

United States Patent
Jin et al.

(10) Patent No.: US 9,785,558 B2
(45) Date of Patent: Oct. 10, 2017

(54) MIXED CACHE MANAGEMENT

(71) Applicant: HUA ZHONG UNIVERSITY OF SCIENCE TECHNOLOGY, Wuhan (CN)

(72) Inventors: Hai Jin, Wuhan (CN); Xuanhua Shi, Wuhan (CN); Song Wu, Wuhan (CN); Xin Yu, Wuhan (CN)

(73) Assignee: HUA ZHONG UNIVERSITY OF SCIENCE TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 15/032,636

(22) PCT Filed: Oct. 29, 2013

(86) PCT No.: PCT/CN2013/086143
§ 371 (c)(1),
(2) Date: Apr. 28, 2016

(87) PCT Pub. No.: WO2015/061965
PCT Pub. Date: May 7, 2015

(65) Prior Publication Data
US 2016/0253259 A1  Sep. 1, 2016

(51) Int. Cl.
*G06F 12/08* (2016.01)
*G06F 12/084* (2016.01)
(Continued)

(52) U.S. Cl.
CPC ........ *G06F 12/084* (2013.01); *G06F 12/0811* (2013.01); *G06F 12/0891* (2013.01);
(Continued)

(58) Field of Classification Search
None
See application file for complete search history.

(56) References Cited

U.S. PATENT DOCUMENTS 6,041,016 A   3/2000  Freker
7,085,890 B2 *  8/2006  Kashyap ............ G06F 12/1054
                                                    711/130
(Continued)

FOREIGN PATENT DOCUMENTS

CN   102831088 A   12/2012
CN   103164362 A    6/2013

OTHER PUBLICATIONS

Rui Min: Improving Performance of Large Physically Indexed Caches by Decoupling Memory Addresses from Cache Addresses. IEEE Transactions on Computers, vol. 50, No. 11, Nov. 2001, pp. 1191-1201.*

(Continued)

*Primary Examiner* — Kaushikkumar Patel
(74) *Attorney, Agent, or Firm* — Turk IP Law, LLC

(57) ABSTRACT

A mixed cache is indexed to main memory and page coloring is applied to map main memory to virtual memory. A nursery array and a mature array are indexed to virtual memory. An access to a virtual page from the mixed cache is recorded by determining an index and a tag of an array address based on a virtual address, following the index to corresponding rows in the nursery and the mature arrays, and determining if the tag in the array address matches any tag in the rows. When there is a match to a tag in the rows, an access count in a virtual page entry corresponding to the matched tags is incremented. When there is no match, a virtual page entry in the row in the nursery array is written with the tag in the array address and an access count in the entry is incremented.

28 Claims, 11 Drawing Sheets

(51) Int. Cl.
- *G06F 12/1045* (2016.01)
- *G06F 12/0811* (2016.01)
- *G06F 12/0891* (2016.01)
- *G06F 12/1009* (2016.01)
- *G06F 12/123* (2016.01)

(52) U.S. Cl.
CPC ...... *G06F 12/1009* (2013.01); *G06F 12/1054* (2013.01); *G06F 12/123* (2013.01); *G06F 2212/604* (2013.01); *G06F 2212/653* (2013.01); *G06F 2212/69* (2013.01); *Y02B 60/1225* (2013.01)

(56) References Cited

U.S. PATENT DOCUMENTS

| | | | | |
|---|---|---|---|---|
| 7,184,944 | B1* | 2/2007 | Rieschl | G06F 12/1009 703/21 |
| 9,390,031 | B2* | 7/2016 | Durham | G06F 12/1475 |
| 2005/0188157 | A1* | 8/2005 | Kashyap | G06F 12/1054 711/130 |
| 2005/0262306 | A1* | 11/2005 | Nenov | G06F 12/0897 711/136 |
| 2008/0126716 | A1* | 5/2008 | Daniels | G06F 12/0875 711/154 |
| 2008/0313420 | A1* | 12/2008 | Beckmann | G06F 12/1054 711/207 |
| 2009/0144503 | A1* | 6/2009 | Faucher | G06F 12/0864 711/128 |
| 2010/0064111 | A1 | 3/2010 | Kunimatsu et al. | |
| 2010/0299482 | A1* | 11/2010 | Levinsky | G06F 12/0864 711/122 |
| 2011/0035548 | A1 | 2/2011 | Kimmel et al. | |
| 2012/0017039 | A1* | 1/2012 | Margetts | G06F 12/08 711/105 |
| 2012/0137075 | A1* | 5/2012 | Vorbach | G06F 9/526 711/122 |
| 2014/0201761 | A1* | 7/2014 | Dalal | H04L 47/193 718/108 |

OTHER PUBLICATIONS

Manu Awasthi et al., "Dynamic Hardware-Assisted Software-Controlled Page Placement to Manage Capacity Allocation and Sharing within Large Caches", 15th International Conference on High-Performance Computer Architecture, Feb. 2009, pp. 250-261.

Mainak Chaudhuri, "PageNUCA: Selected Policies for Page-grain Locality Management in Large Shared Chip-multiprocessor Caches", 15th International Symposium on High Performance Computer Architecture, Feb. 14-18, 2009, pp. 227-238.

Y. C. Chen et al., "Ultra-Thin Phase-Change Bridge Memory Device Using GeSb", International Electron Devices Meeting, Dec. 11-13, 2006, pp. 4.

M. Hosomi et al., "A Novel Nonvolatile Momery with Spin Torque Transfer Magnetization Switching: Spin-RAM", International Electron Devices Meeting, Dec. 2005, pp. 459-462, Retrieved file from IEEE Xplore on Jul. 28, 2009.

International Search Report and Written Opinion of the International Searching Authority, International application No. PCT/CN2013/086143, Jul. 29, 2014.

Jiang Lin et al., "Gaining Insights into Multicore Cache Partitioning: Bridging the Gap Between Simulation and Real Systems", IEEE 14th International Symposium on High Performance Computer Architecture, Feb. 16-20, 2008, pp. 367-378.

R. E. Matick et al., "Logic-based eDRAM: Origins and Rationale for Use", IMB journal reference, Jan. 2005, pp. 145-165, vol. 49, No. 1.

Guangyu Sun et al., "A Novel Architecture of the 3D Stacked MRAM L2 Cache for CMPs", IEEE 15th International Symposium on High Performance Computer Architecture, Feb. 14-18, 2009, pp. 239-249.

Xiaoxia Wu et al., "Hybrid Cache Architecture with Disparate Memory Technologies", ISCA'09, Jun. 20-24, 2009, pp. 34-45.

* cited by examiner

MIXED CACHE MANAGEMENT

CROSS-REFERENCE TO RELATED APPLICATION

The present application is a U.S. national stage filing under 35 U.S. C. §371 of International Application No. PCT/CN2013/086143, filed on Oct. 29, 2013 and entitled "MIXED CACHE MANAGEMENT." The International Application, including any appendices or attachments thereof, is incorporated by reference herein in its entirety.

TECHNICAL FIELD

The present disclosure generally but not exclusively relates to mixed cache management.

BACKGROUND INFORMATION

Unless otherwise indicated herein, the approaches described in this section are not prior art to the claims in this application and are not admitted to be prior art by inclusion in this section.

Operating systems may employ virtual memory to simulate more main memory (also known as "system memory") than that actually exists, allowing computers to run larger programs and multiple programs concurrently. An operating system (OS) may assign physical pages (also known as "page frames") in main memory to virtual pages in virtual memory and may record their mappings in page tables.

Computers may employ caching to mitigate a processor-memory gap that may stem from memory access latency. When a processor is to read from or write to a location in main memory, the processor may first determine if a copy of that data is in a cache. If so, the processor reads from or writes to the cache, which is faster than reading from or writing to the main memory.

Computers may use multiple levels of cache, each bridging the gap between the processor and the main memory. A level 1 (L1) cache may be built into a processor chip while a level 2 (L2) cache may be built into the processor chip, in a processor package, or on a motherboard. The L1 cache may be optimized for fast access time while the L2 cache may be optimized for low miss rate.

SUMMARY

In examples of the present disclosure, virtual pages are migrated between cache regions of different memory types in a mixed cache. The mixed cache is indexed to a main memory having physical pages, where each physical page in the main memory is mapped to one group of contiguous cache sets in the mixed cache. Page coloring is applied so that physical pages of different colors are assigned to adjacent virtual pages of a virtual memory comprising the virtual pages. A nursery array and a mature array are indexed to the virtual memory, where each virtual page is mapped to one row in the nursery array and one row in the mature array.

Access to a particular virtual page of the virtual memory is recorded as follows. A virtual address for the particular virtual page is received. An index and a tag of an array address to the nursery array and the mature array are determined from the received virtual address. The determined index of the array address is followed to a row in the nursery array and a row in the mature array. The row in the nursery array and the row in the mature array include virtual page entries.

It is determined whether or not the determined tag of the array address matches any tag in the virtual page entries of the row in the nursery array and the row in the mature array. In response to a non-match between the determined tag of the array address and any tag in the virtual page entries of the row in the nursery array and the row in the mature array, a virtual page entry of the row in the nursery array is written with the determined tag of the array address and an access count. In response to a match between the determined tag of the array address and the tag in the virtual page entry, incrementing the access count in the virtual page entry corresponding to the matched tags.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are therefore not to be considered limiting of its scope, the disclosure will be described with additional specificity and detail through use of the accompanying drawings.

In the drawings.

DETAILED DESCRIPTION

Figure 1:
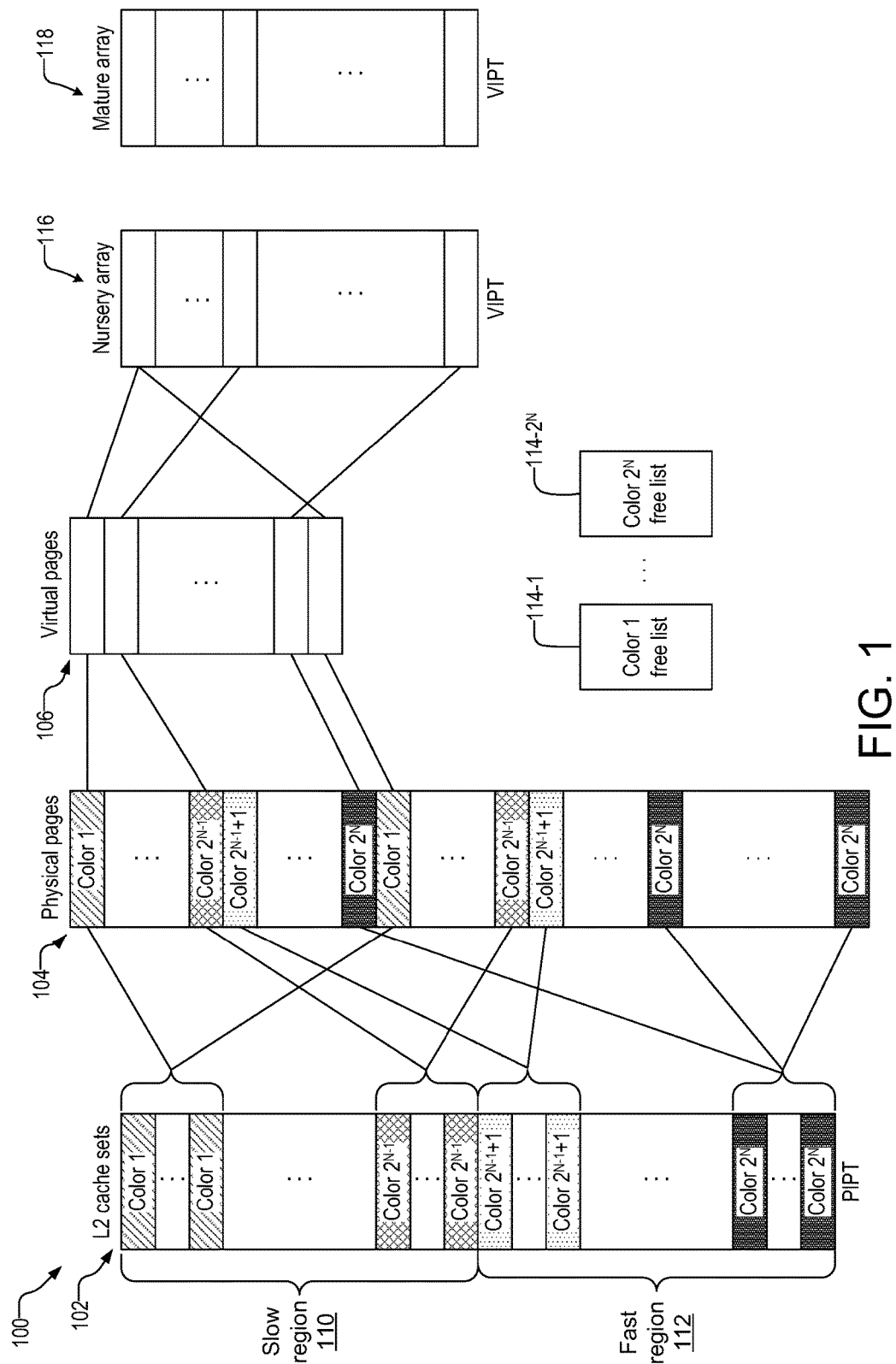
FIG. 1 is a block diagram illustrating a caching technique for a cache according to at least some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Advancements in technology may allow a processor cache to incorporate different types of memory. Some memories may have low latency but high power consumption. Others memories may have high latency but low power consumption. Thus, this disclosure is generally drawn, inter alia, to methods, apparatus, systems, devices, and computer program products that take advantage of the characteristics of the different memories in a mixed cache to improve cache performance, reduce energy consumption, or do both and/or provide other features.

Briefly stated, in examples of the present disclosure, a mixed cache is indexed to main memory and page coloring is applied. A nursery array and a mature array are indexed to virtual memory and are used to record virtual page access information. The virtual page access information then used by an operating system to determine if a virtual page is to be remapped from a physical page mapped to one cache region to another physical page mapped to another cache region.

An access to a virtual page at a virtual address is recorded by determining an index and a tag of an array address based on the virtual address, following the index to a row in the nursery array and a row in the mature array, and determining whether or not the tag in the array address matches any tag in the rows. When there is a match to a tag in the rows, an access count in a virtual page entry corresponding to the matched tags is incremented. When the tag in the array address does not match any tag in the rows, a virtual page entry in the row in the nursery array is written with the tag in the array address and an access count in the virtual page entry is incremented.

FIG. 1 is a block diagram illustrating a caching technique 100 for a cache 102 according to at least some examples of the present disclosure. Caching technique 100 may be implemented by software, hardware, or a combination of software and hardware, including an operating system (OS) executed by a processor. Cache 102 may be the last level cache (LLC) that a processor calls before accessing a main memory 104. For example, cache 102 may be a level 2 (L2) or a level 3 (L3) cache for the processor.

Cache 102 may be a set associative cache that includes multiple cache sets. A cache set may be a "row" in cache 102 that includes multiple entries each belonging to a different "way." Each entry may include a valid bit, a cache tag, and a cache block. A valid bit may indicate if the data in a cache block is valid. A cache tag may uniquely identify the data in a cache block as one of the multiple memory blocks in main memory 104 that may be mapped to the cache block. Each way of cache 102 may be located in one memory bank so that the ways can be accessed in parallel.

Cache 102 may be accessed using a cache address that includes a cache tag, a set index (also known as a "set number"), and a block offset. The set index may identify a cache set in cache 102. The cache tag in the cache address may be compared against cache tags in the cache set for a match.

In reading data with a particular cache address in cache 102, a cache read hit may occur when the cache tag in the cache address matches a cache tag in the cache set and the corresponding cache block may be read at the block offset specified in the cache address. A cache read miss may occur when the cache tag in the cache address does not match any of the cache tags in the cache set. Thus, data from a memory block in main memory 104 and the data's cache tag may be loaded into a cache block in the cache set. When the cache set is full, new data may replace old data in one of the cache blocks based on a replacement policy, such as the least recently used (LRU).

In writing data to cache 102, a write-back policy or a write-through policy may be used. If a write-back policy is used, a dirty bit may be set when a cache block is written to indicate the data is to be written back to main memory 104 when another memory block needs to use the cache block. If a write-through policy is used, data written to cache 102 may also be written to main memory 104.

In writing data with a particular cache address in cache 102, a cache hit may occur when the cache tag in the cache address matches a cache tag in the cache set and data is written to the corresponding cache block at the block offset specified in the cache address. A cache miss may occur when the cache tag in the cache address does not match any of the cache tags in the cache set. On a write cache miss, a write allocate or a write around (no-write allocate) approach may be used. If a write allocate approach is used, data from a memory block in main memory 104 and the data's cache tag may be loaded into a cache block in the cache set, and a write cache hit operation may be performed to write to the cache block at the block offset specified in the cache address. When the cache set is full, new data may replace old data based on a replacement policy. If a write around approach is used, data may be written to main memory 104 without being cached.

Cache 102 may be indexed to main memory 104 so that every physical page in main memory 104 has a fixed mapping to a group of physically contiguous cache sets in cache 102. For example, cache 102 may be physically indexed and physically tagged (PIPT) to main memory 104 so that set indices and cache tags correspond to physical addresses in main memory 104. Physical pages in main memory 104 mapped to the same group of physically contiguous cache sets in cache 102 may be said to have the same "color." Adjacent physical pages in main memory 104 may have different colors when they are mapped to different groups of physically contiguous cache sets in cache 102. The indexing may be implemented in hardware or software.

The OS may provide virtual memory 106 to various processes. More specifically, the OS may provide separate virtual address spaces to each process. The OS may maintain a page table for each virtual address space that maps virtual addresses in that space to physical addresses in main memory 104. Using page coloring (also sometimes referred to as "cache coloring"), the OS may assign adjacent virtual pages to physical pages of different colors. This assignment may ensure that adjacent virtual pages are mapped to different groups of physically contiguous cache sets, so that the adjacent virtual pages do not contend for the same positions in cache 102.

The OS may use a buddy allocation system to allocate contiguous physical pages in main memory 104 to a request for virtual pages from a process. The OS may maintain linked lists 114-1 to 114-$2^N$ of free physical pages for every color, where N is the number of color bits 208 (described later with reference to FIG. 2A).

In examples of the present disclosure, cache 102 may be a mixed cache (sometimes also known as "hybrid cache") having two or more types of memories with different characteristics. Each memory type may form a region with continuous addresses in mixed cache 102. For example, mixed cache 102 may have a slow cache region 110 of embedded dynamic random-access memory (eDRAM) with continuous addresses and a fast cache region 112 of static random-access memory (SRAM) with continuous addresses. For convenience, a physical page mapped to a group of physically contiguous cache sets in a region of cache 102 may also be referred to as a physical page mapped to that region. Similarly, a virtual page mapped to a physical page mapped to a group of physically contiguous cache sets in a region of cache 102 may also be referred to as a virtual page mapped to that region.

Figure 2A:
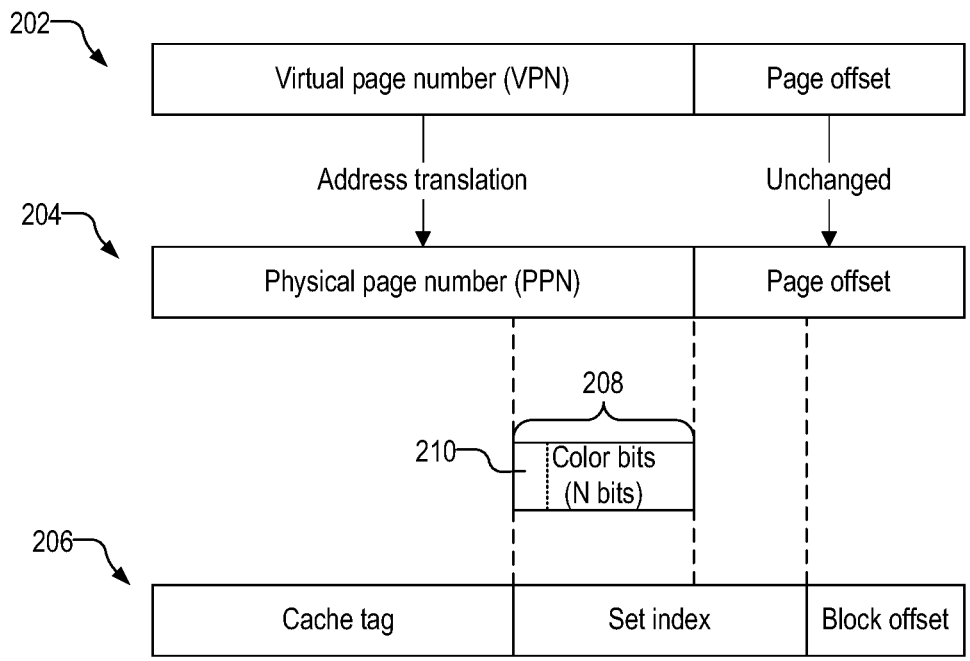
FIG. 2A shows mappings of a virtual address to a physical address to a cache address according to at least some examples of the present disclosure.

FIG. 2A shows a mapping of a virtual address 202 to a physical address 204 according to at least some examples of the present disclosure. In the mapping, a virtual page number (VPN) may be translated to a physical page number (PPN) but a page offset may remain the same.

FIG. 2A also shows the correspondence between the bits of physical address 204 and the bits of a cache address 206 in at least some examples of the present disclosure. A portion of the physical page number field in physical address 204 may overlap a portion of the set index field in cache address 206. This overlap 208 may be referred to as color bits as they may determine the color of the physical page. The OS has control of color bits 208 as it controls the assignment of physical pages to virtual pages (e.g., the OS controls the PPNs). Thus, the OS can assign a physical page of a particular page color to a virtual page to control the placement of data for that virtual page in cache 102 (FIG. 1).

In examples of the present disclosure, the most significant bit 210 (hereafter "hybrid bit") in color bits 208 may determine if a physical page is mapped to slow cache region 110 (FIG. 1) or fast cache region 112 (FIG. 1) in cache 102. For example, a physical page with a physical address having a hybrid bit 210 of zero (0) may be mapped to slow cache region 110, and a physical page with a physical address having a hybrid bit 210 of one (1) may be mapped to fast cache region 112. Thus, the OS can migrate a virtual page mapped to one cache region to another cache region by remapping the virtual page to a new physical page having a physical address with the opposite hybrid bit 210. When the new physical page is a free physical page from linked lists 114-1 to 114-$2^N$, the old physical page may be freed and returned to one of linked lists 114-1 to 114-$4^N$. When there is not any free physical page with the appropriate hybrid bit 210, the virtual page may swap physical pages with another virtual page based on a replacement policy.

In examples of the present disclosure, the OS may monitor for a first type of virtual page that is accessed in a predetermined pattern (e.g., "hot" virtual pages that are read frequently). When a hot virtual page is found to be mapped to a particular cache region, the OS may migrate that page to another cache region. For example, if the goal is to increase throughput, the OS may migrate a hot virtual page from slow cache region 110 to fast cache region 112.

In examples of the present disclosure, the OS also may monitor for a second type of virtual page that is accessed in a predetermined pattern (e.g., "cold" virtual pages that are read infrequently). When a cold virtual page is found to be mapped to a particular cache region, the OS may migrate that page to another cache region. For example, if the goal is to increase throughput, the OS may migrate a cold virtual page from fast cache region 112 to slow cache region 110.

Other goals are available, such as conserving energy. Depending on the power consumption to read and write a type of memory, the predetermined pattern for migrating a virtual page may be a read count, a write count, a read-write ratio, or other factor(s) or a combination thereof. For example, a hot virtual page with a low read-write ratio may be migrated to a cache region with low write power consumption.

Referring back to FIG. 1, the OS may use a nursery array 116 and a mature array 118 to determine whether or not to migrate a virtual page from one cache region to another. Nursery array 116 and mature array 118 may have a similar data structure as cache 102, but they may store virtual page access information instead of data from main memory 104. Nursery array 116 and mature array 118 may be indexed to virtual memory 106 so every virtual page in virtual memory 106 may have a fixed mapping to a row (similar to a cache set) in nursery array 116 and a corresponding row in mature array 118. For example, nursery array 116 and mature array 118 may be virtually indexed and physically tagged (VIPT) to virtual memory 106 so row indices (similar to set indices) correspond to virtual addresses while cache tags correspond to physical addresses. For clarity's sake, the mapping is only shown for virtual memory 106 and nursery array 116. The indexing may be implemented in hardware or software.

Figure 2B:
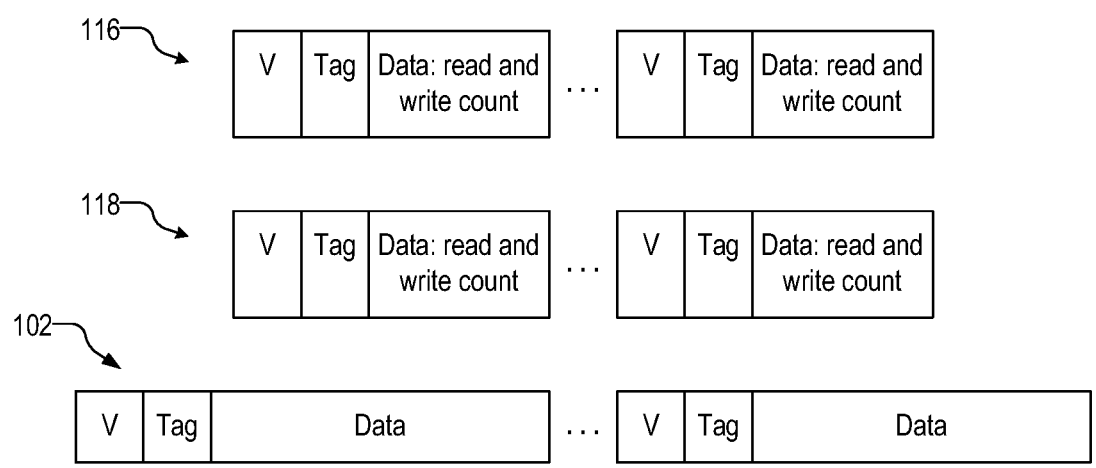
FIG. 2B shows a row in a nursery array, a row in a mature array, and a row in a cache of FIG. 1 according to at least some examples of the present disclosure.

Referring to FIG. 2B, each row in nursery array 116 and mature array 118 may include multiple virtual page entries that may each belong to a different way. Each virtual page entry may include a valid bit, a cache tag, and a cache block. The cache block may store a read count and a write count for a virtual page identified by the cache tag.

Each valid entry may initially exist in nursery array 116. When a process accesses virtual memory 106 at a virtual address, the virtual address may be used to access data of the virtual page from cache 102 as well as to record the access of the virtual page from cache 102 in nursery array 116 or mature array 118. Every $n^{th}$ access from cache 102 (the last level cache) may be recorded in nursery array 116 or mature array 118, where n is greater than or equal to one (e.g., 1, 2, or 4). For example, n may be 4 so every fourth access from cache 102 is recorded in nursery array 116 or mature array 118.

Figure 2C:
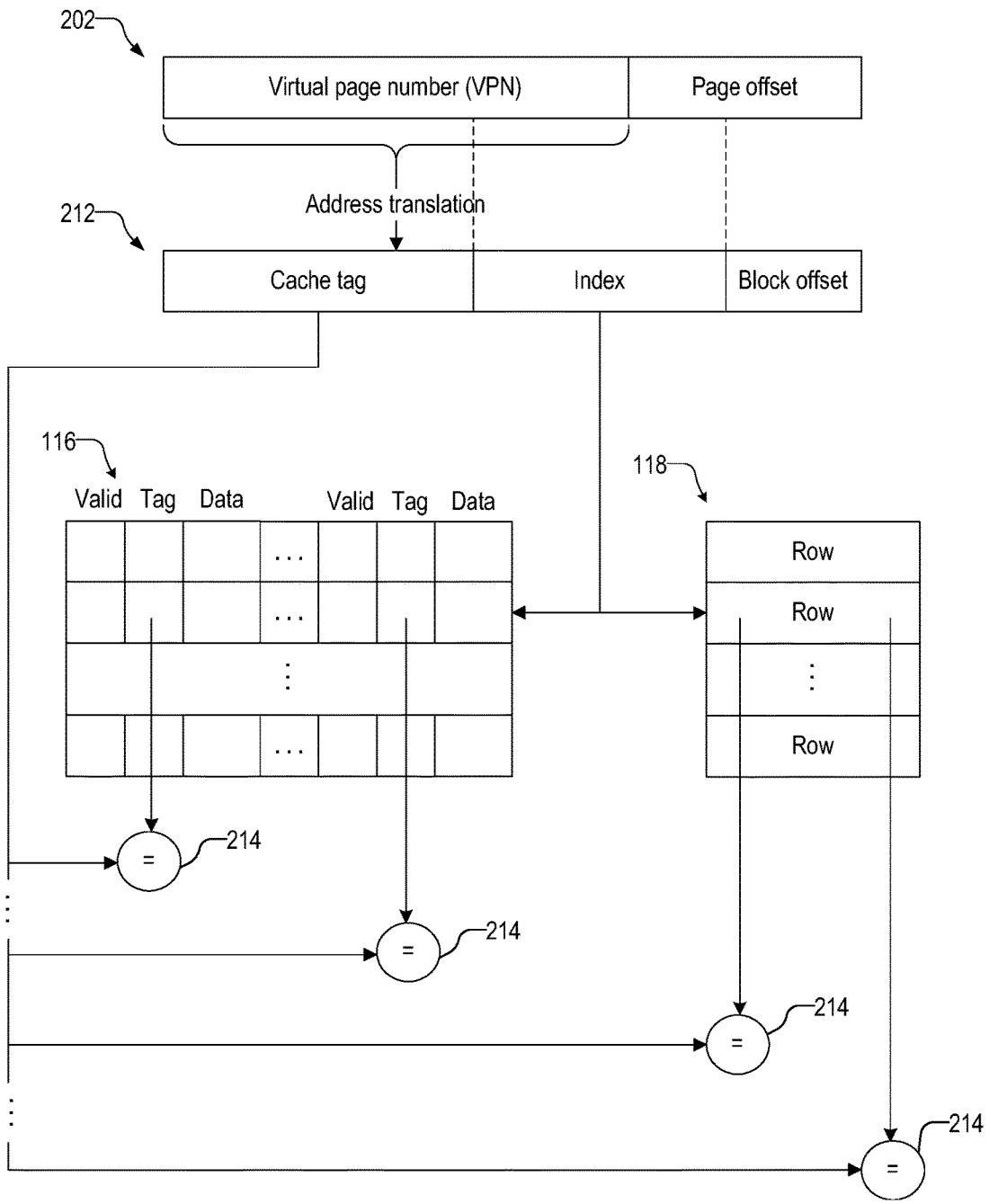
FIG. 2C shows a mapping of a virtual address to an array address in the nursery array and the mature array of FIG. 1 according to at least some examples of the present disclosure.

FIG. 2C shows the correspondence between the bits of virtual address 202 and the bits of an array address 212 in nursery array 116 and mature array 118 according to at least some examples of the present disclosure. A portion of the page offset field and a portion of the VPN field in virtual address 202 may form the index field in array address 212. The index in the index field may identify a row in nursery array 116 and a corresponding row in mature array 118. The VPN in virtual address 202 may be translated to determine a PPN, which has a portion that may form the cache tag in array address 212. The cache tag in the array address 212 may be compared against cache tags in the row in nursery array 116 and the row in mature array 118.

In accessing a virtual page entry with a particular array address in nursery array 116 and mature array 118, an "array hit" may occur when the cache tag in the array address matches a cache tag in one of the two rows, and the read count or the write count in the corresponding cache block may be incremented by one depending on the access type. An "array miss" may occur when the cache tag in the array address does not match any of the cache tags in the two rows. In an array miss, one of the virtual page entries in the row of nursery array 116 may be written with the cache tag of the virtual address, may have its valid bit set, and may have an access count incremented. When the row in nursery array 116 is full, new data may replace old data in one of the virtual page entries based on a replacement policy, such as the LRU. Array hits and array misses are determined by comparators 214 that compare the cache tags in the rows of nursery array 116 and mature array 118 selected by the index in array address 212 against the cache tag in array address 212.

When a virtual page entry in nursery array 116 shows that a virtual page is accessed in a predetermined pattern, such as a read count, a write count, or a read-write ratio being greater than a threshold, the corresponding virtual page entry may be moved from nursery array 116 to mature array 118. For example, the valid bit of the virtual page entry in nursery array 116 may be reset and its data may be copied to one of the virtual page entries in a corresponding row in mature array 118. When the row in mature array 118 is full, one virtual page entry may be selected based on a replacement policy, such as the LRU, and swapped with the virtual page entry in nursery array 116.

When an entry in mature array 118 shows that a virtual page mapped to slow cache region 110 is accessed in a predetermined pattern, such as a read count, a write count, or a read to write ratio being greater than a threshold, the OS may migrate the virtual page from being mapped to slow cache region 110 to being mapped to fast cache region 112. As described above, the OS can migrate a virtual page by remapping the virtual page to a new physical page having a physical address with the opposite hybrid bit 210 (FIG. 2A). When the new physical page with the appropriate hybrid bit 210 is a free physical page from linked lists 114-1 to 114-$2^N$, the old physical page may be freed and returned to one of linked lists 114-1 to 114-$4^N$. Cached data of the virtual page may be migrated to cache blocks in cache sets assigned to the new physical page. When there is not any free physical page with the appropriate hybrid bit 210, the virtual page may swap physical pages and cached data with another virtual page based on a replacement policy.

When an entry in mature array 118 shows that a virtual page is accessed in a predetermined pattern, such as a read count, a write count, or a read to write ratio being less than a threshold, the corresponding virtual page entry may be moved from mature array 118 to nursery array 116. For example, the valid bit of the virtual page entry in mature array 118 may be reset and its data may be copied to one of the virtual page entries in a corresponding row in nursery array 116. When the cache set is full, new data may replace old data in one of the cache blocks based on a replacement policy, such as LRU.

When an entry in nursery array 116 shows that a virtual page mapped to fast cache region 112 is accessed in a predetermined pattern, such as a read count, a write count, or a read to write ratio being less than a threshold, the OS may migrate the virtual page from fast cache region 112 to slow cache region 110. As described above, the OS can migrate a virtual page by remapping the virtual page to a new physical page having a physical address with the opposite hybrid bit 210. When the new physical page with the appropriate hybrid bit 210 is a free physical page from linked lists 114-1 to 114-$2^N$, the old physical page may be freed and returned to one of linked lists 114-1 to 114-$4^N$. Cached data of the virtual page may be migrated to cache blocks in the cache sets assigned to the new physical page. When there is not any free physical page with the appropriate hybrid bit 210, the virtual page may swap physical page and cached data with another virtual page based on a replacement policy.

Figure 3:
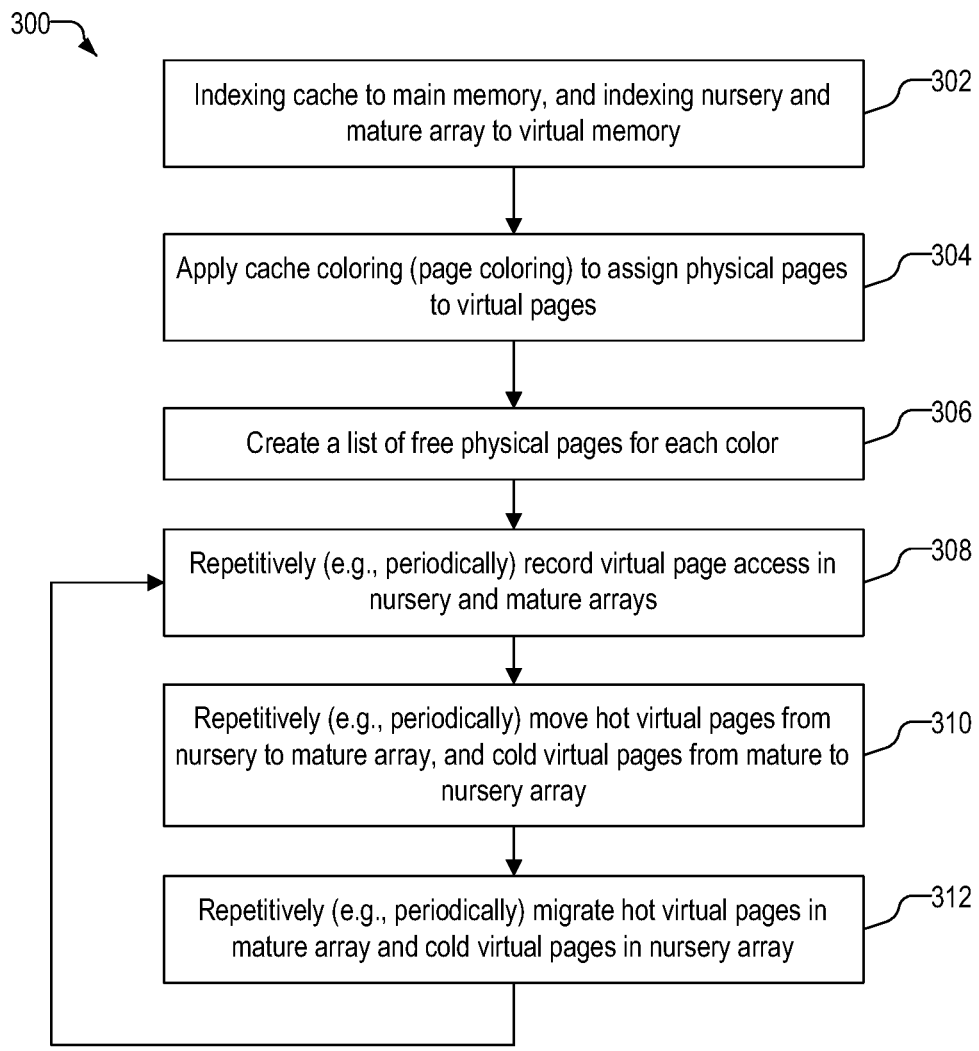
FIG. 3 is a flowchart of a method to implement the caching technique of FIG. 1 according to at least some examples of the present disclosure.

FIG. 3 is a flowchart of a method 300 to implement caching technique 100 (FIG. 1) for mixed cache 102 (FIG. 1) according to at least some examples of the present disclosure. Method 300 and other methods described in the present disclosure may include one or more operations, functions, or actions as illustrated by one or more of blocks. Although the blocks are illustrated in a sequential order, these blocks may also be performed in parallel, and/or in a different order than those described herein. Also, the various blocks may be combined into fewer blocks, divided into or supplemented with additional blocks, and/or eliminated based upon the particular implementation. Method 300 may begin in block 302.

In block 302, mixed cache 102 may be indexed to main memory 104. Nursery array 116 and mature array 118 may be indexed to virtual memory 106. Block 302 may be followed by block 304.

In block 304, the OS may apply cache coloring (e.g., page coloring) to assign physical pages in main memory 104 to virtual pages in virtual memory 106. Block 304 may be followed by block 306.

In block 306, the OS may create and maintain at least one list (e.g., lists 110-1 to 110-$2^N$) to track free physical pages of each color. Block 306 may be followed by block 308.

In block 308, virtual page access information may be repeatedly, such as periodically, recorded in nursery array 116 and mature array 118. As discussed above, every $n^{th}$ LLC access from mixed cache 102 may be recorded in nursery array 116 or mature array 118. As will be described later, a sampler 714 (FIG. 7) may periodically or otherwise repeatedly record virtual page access information in nursery array 116 and mature array 118. Block 308 may be followed by block 310.

In block 310, hot virtual pages in nursery array 116 may be periodically or otherwise repeatedly moved to mature array 118. Similarly cold virtual pages in mature array 118 may be periodically or otherwise repeatedly moved to nursery array 116. As will be described later, sampler 714 (FIG. 7) may periodically or otherwise repeatedly move hot and cold virtual pages between nursery array 116 and mature array 118. Block 310 may be followed by block 312.

In block 312, the OS may periodically or otherwise repeatedly migrate hot virtual pages in mature array 118 to a different cache region (e.g., from slow cache region 110 to fast cache region 112). Similarly, the OS may periodically or otherwise migrate cold virtual pages in nursery array 116 to another cache region (e.g., from fast cache region 112 to slow cache region 110). Block 312 may loop back to block 308.

Figure 4:
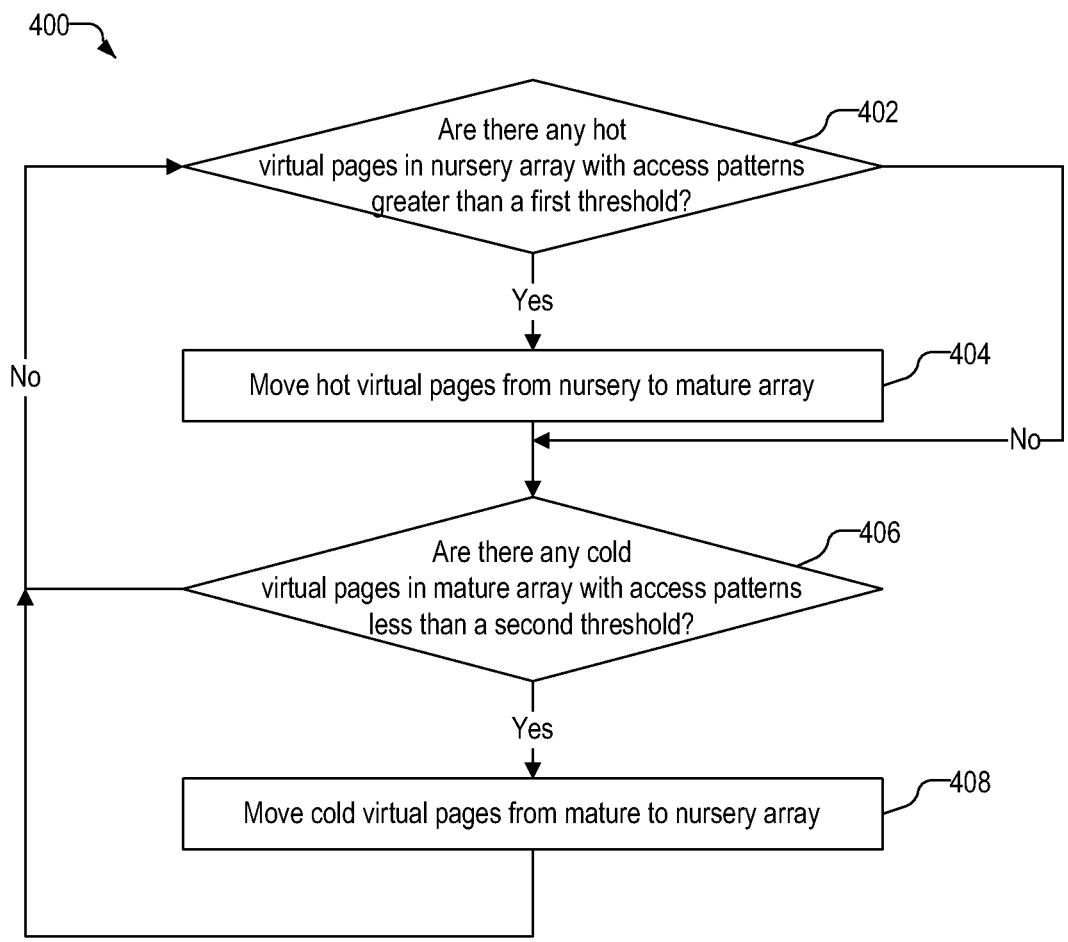
FIG. 4 is a flowchart of a method to move virtual page entries between the nursery and the mature arrays in the method of FIG. 3 according to at least some examples of the present disclosure.

FIG. 4 is a flowchart of a method 400 to implement block 310, to move virtual page entries between the nursery array 116 and the mature array 118, according to at least some examples of the present disclosure. Method 400 may begin in block 402.

In block 402, it is determined whether or not there are any hot virtual pages in nursery array 116 with access patterns greater than a first threshold. The access pattern may be a read count, a write count, or a read-write ratio. If so, block 402 may be followed by block 404. Otherwise, block 402 may be followed by block 406.

Figure 6:
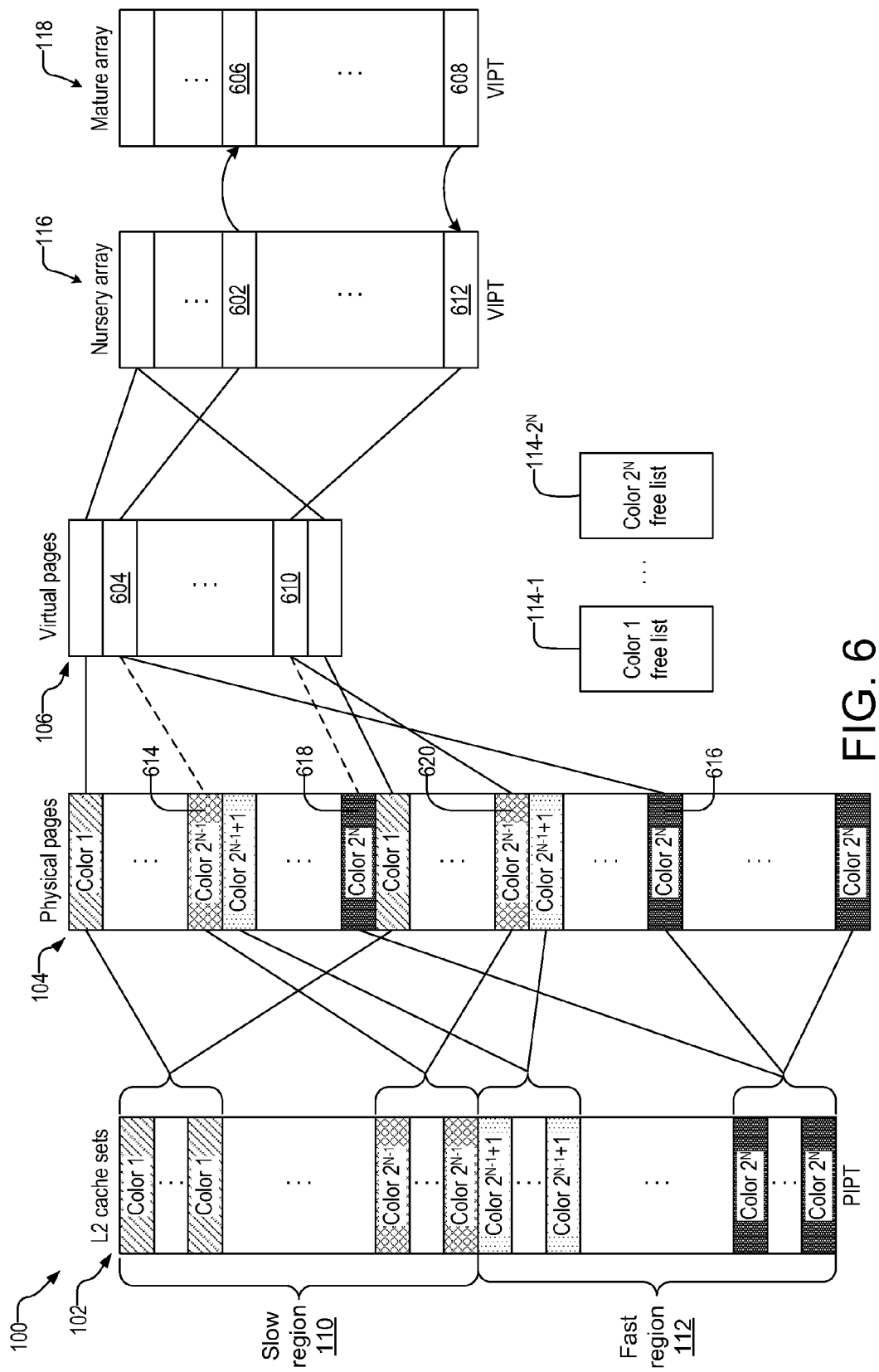
FIG. 6 is a block diagram illustrating movement of virtual page entries between the nursery and the mature arrays and migration of a virtual page between a slow cache region and a fast cache region according to at least some examples of the present disclosure.

In block 404, the hot virtual pages in nursery array 116 may be moved to mature array 118. For example, FIG. 6 shows an entry 602 for a virtual page 604 being moved from nursery array 116 to an entry 606 in mature array 118. Referring back to FIG. 4, block 404 may be followed by block 406.

In block 406, it is determined whether or not there are any cold virtual pages in mature array 118 with access patterns less than a second threshold. The access pattern may be a read count, a write count, or a read-write ratio. If so, block 406 may be followed by block 408. Otherwise block 406 may loop back to block 402 following a timeout.

In block 408, the cold virtual pages in mature array 118 may be moved to nursery array 116. For example, FIG. 6 shows an entry 608 for a virtual page 610 being moved from mature array 118 to an entry 612 in nursery array 116. Referring back to FIG. 4, block 404 may loop back to block 406 following a timeout.

Figure 5:
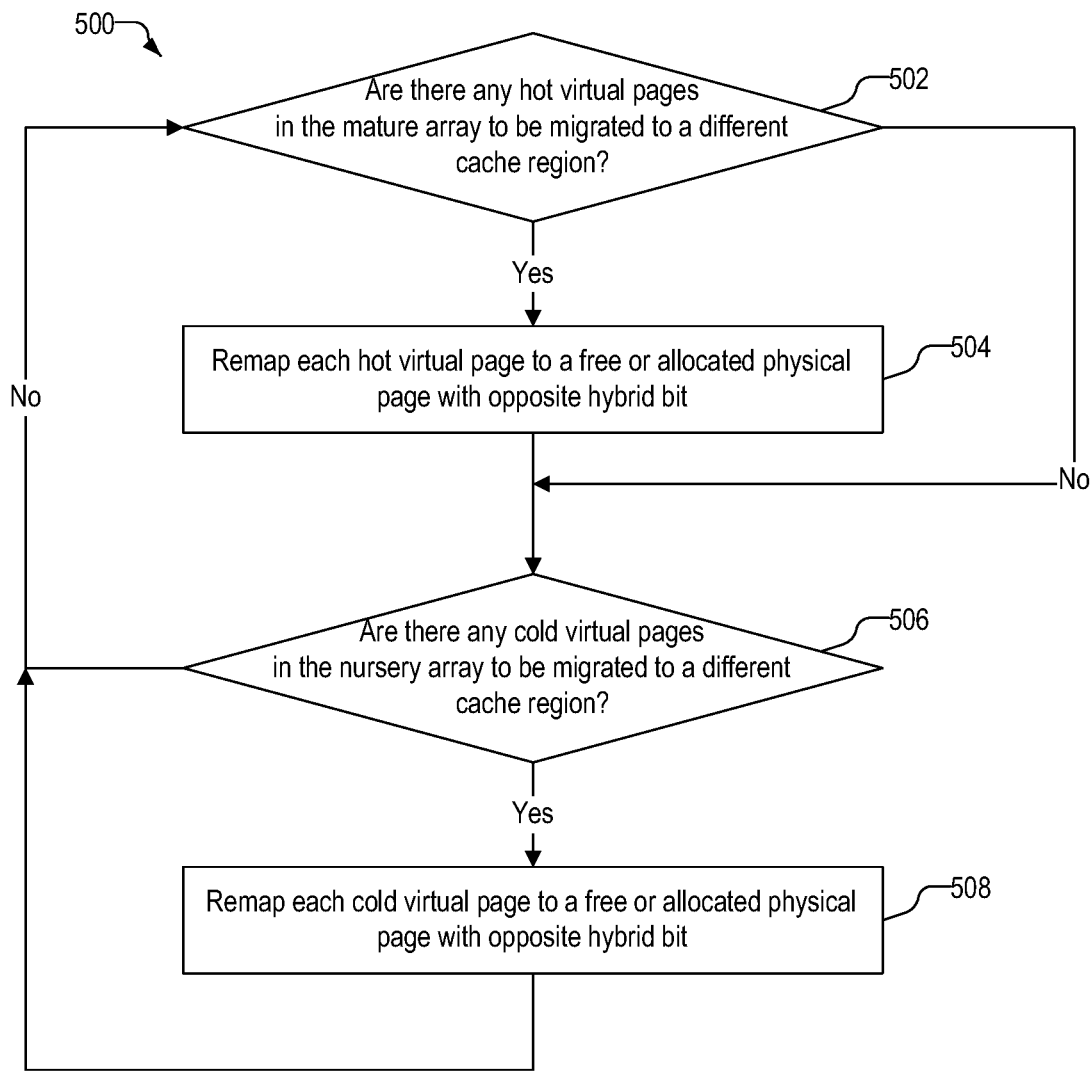
FIG. 5 is a flowchart of a method to migrate virtual pages from being mapped to one cache region to another in the method of FIG. 3 according to at least some examples of the present disclosure.

FIG. 5 is a flowchart of a method 500 to implement block 312, to migrate virtual pages from being mapped to one cache region to another cache region, according to at least some examples of the present disclosure. Method 500 may begin in block 502.

In block 502, the OS may determine if there are any hot virtual pages in mature array 118 to be migrated to a different cache region. For example, the OS may migrate hot virtual pages that are mapped to slow cache region 110 and that have access patterns greater than a threshold to fast cache region 112. The OS determines that a hot virtual page is mapped to slow cache region 110 from the value of the hybrid bit of the physical page mapped to the virtual page. The access pattern may be a read count, a write count, or a read-write ratio. If there are any hot virtual pages in mature array 118 to be migrated to a different cache region, block 502 may be followed by block 504. Otherwise, block 502 may be followed by block 506.

In block 504, the OS may remap every hot virtual page to a free physical page with opposite hybrid bit 210. If multiple free physical pages with the opposite hybrid bit 210 are available from linked lists 114-1 to 114-2$^N$, the OS may use a round-robin scheduling to select a free physical page in order to distribute the hot virtual pages among the available colors. If a free physical page is not available, the OS may swap physical pages and cached data with another virtual page based on a replacement policy. For example, FIG. 6 shows virtual page 604 mapped to a physical page 614 being remapped to a physical page 616, thereby changing the underlying cache blocks from slow cache region 110 to fast cache region 112. The data of the virtual page in the cache sets of slow cache region 110 may also be copied to the new cache sets of fast cache region 112. Referring back to FIG. 5, block 504 may be followed by block 506.

In block 506, the OS may determine if there are any cold virtual pages in nursery array 116 to be migrated to a different cache region. For example, the OS may migrate cold virtual pages that are mapped to fast cache region 112 and that have access patterns less than a fourth threshold to slow cache region 110. The access pattern may be a read count, a write count, or a read-write ratio. If there are any cold virtual pages in nursery array 116 to be migrated to a different cache region, block 506 may be followed by block 508. Otherwise, block 506 may loop back to block 502 following a timeout.

In block 508, the OS may remap every cold virtual page to a free physical page with the opposite hybrid bit 210. If multiple free physical pages with the opposite hybrid bit 210 are available from linked lists 114-1 to 114-2$^N$, the OS may use a round-robin scheduling to select a free physical page in order to distribute the cold virtual pages among the available colors. If a free physical page is not available, the OS may swap physical pages and cached data with another virtual page based on a replacement policy. For example, FIG. 6 shows a virtual page 610 mapped to a physical page 618 being remapped to a physical page 620, thereby changing the underlying cache blocks from fast cache region 112 to slow cache region 110. Referring back to FIG. 5, block 508 may loop back to block 502 following a timeout.

Figure 7:
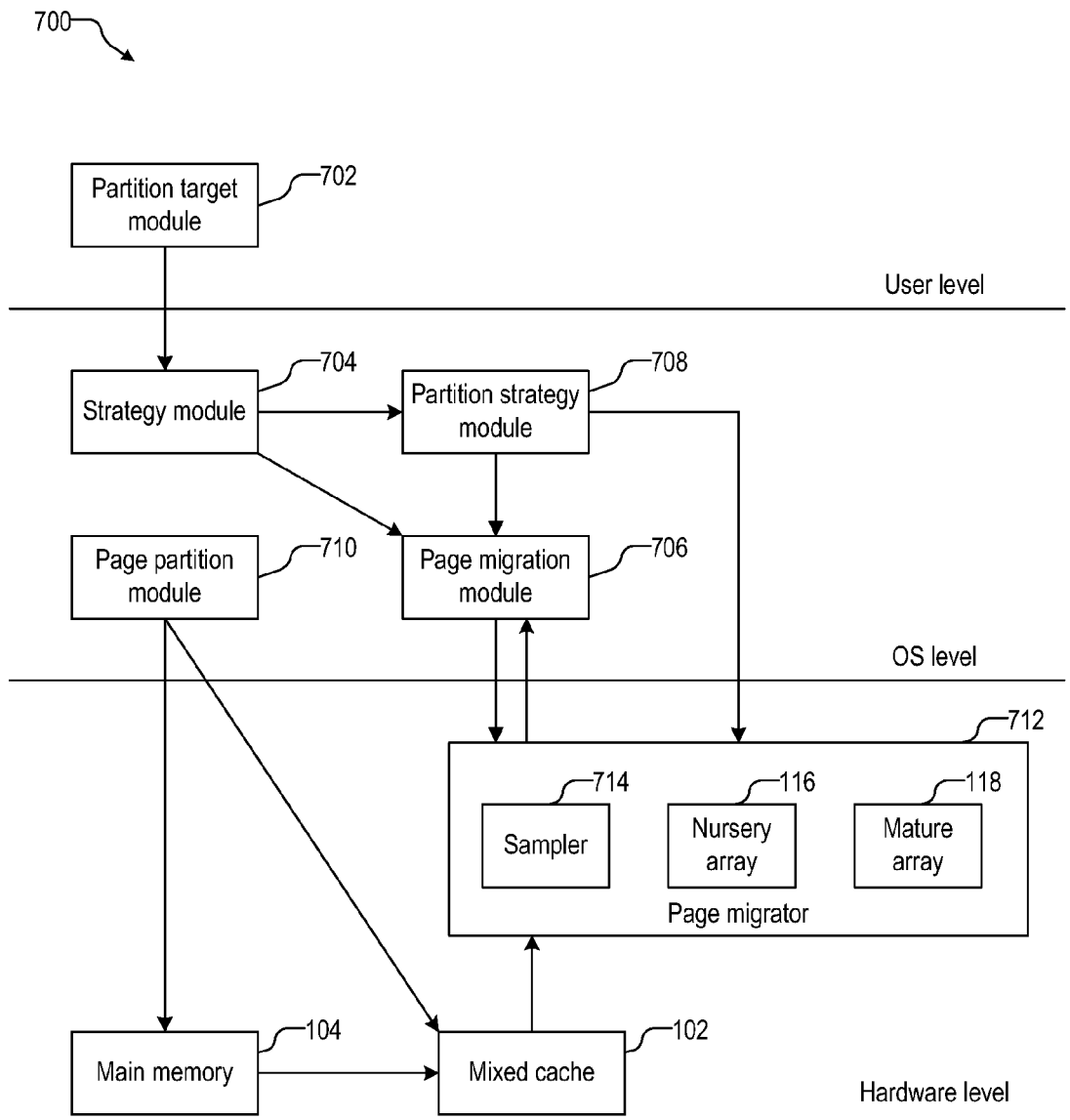
FIG. 7 is a flow diagram of a computing system to implement the caching technique of FIG. 1 according to at least some examples of the present disclosure.

FIG. 7 is a flow diagram of a computing system 700 to implement caching technique 100 (FIG. 1) for mixed cache 102 (FIG. 1) according to at least some examples of the present disclosure. Computing system 700 may include a user level, an OS level, and a hardware level. A partition target module 702 may reside at the user level. At the OS level, there may reside a strategy module 704, a page migration module 706, a partition strategy module 708, and a page partition module 710. At the hardware level, there may reside a page migrator 712, mixed cache 102, and main memory 104. Page migrator 712 may include a sampler 714, nursery array 116, and mature array 118. The various components of the computing system 700 may be operatively coupled to each other.

Figure 8:
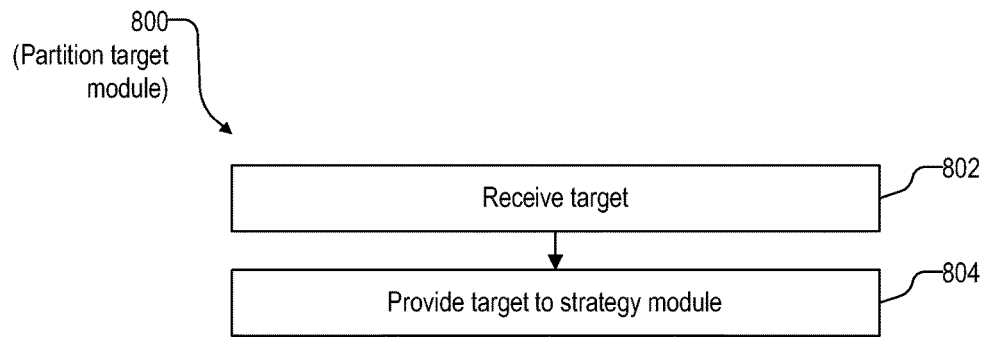
FIG. 8 is a flowchart of a method performed by a partition target module in the computing system of FIG. 7 in the caching technique of FIG. 1 according to at least some examples of the present disclosure.

FIG. 8 is a flowchart of a method 800 implemented by partition target module 702 according to at least some examples of the present disclosure. The partition target module 702 may be implemented in software or other computer-readable instructions stored on a tangible non-transitory computer-readable storage medium and executable by one or more processors, in hardware, or in a combination of hardware and such computer-readable instructions. Method 800 may begin in block 802.

In block 802, partition target module 702 may receive or otherwise detect an input of a performance target. The performance target may be a certain throughput or energy saving. Block 802 may be followed by block 804.

In block 804, partition target module 702 may provide the performance target to strategy module 704.

Figure 9:
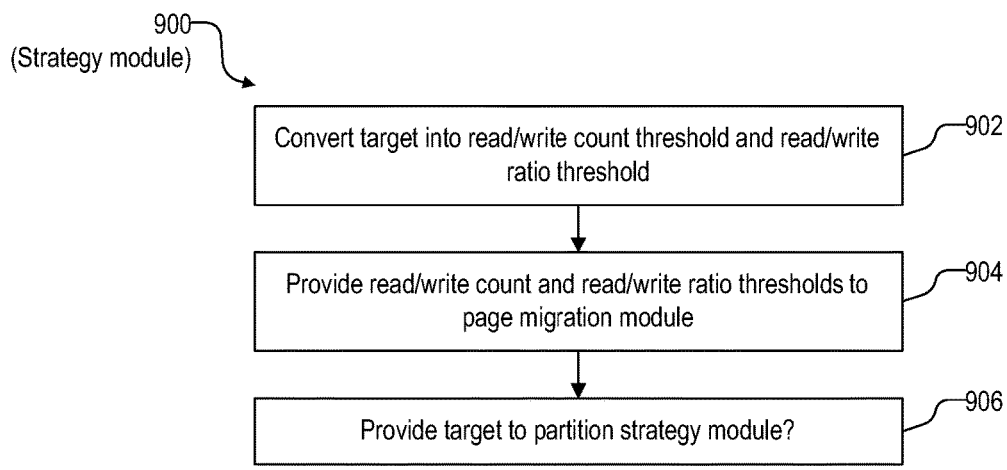
FIG. 9 is a flowchart of a method performed by a strategy module in the computing system of FIG. 7 in the caching technique of FIG. 1 according to at least some examples of the present disclosure.

FIG. 9 is a flowchart of a method 900 implemented by strategy module 704 according to at least some examples of the present disclosure. Strategy module 704 may be implemented in software or other computer-readable instructions stored on a tangible non-transitory computer-readable storage medium and executable by one or more processors, in hardware, or in a combination of hardware and such computer-readable instructions. Method 900 may begin in block 902.

In block 902, strategy module 704 may convert the performance target into a threshold for migrating a hot virtual page and a threshold for migrating a cold virtual page. The threshold may be a read count, a write count, or a read-write ratio. Block 902 may be followed by block 904.

In block 904, strategy module 704 may provide the thresholds to page migration module 706. Block 904 may be followed by block 906.

In block 906, strategy module 704 may provide the performance target to partition strategy module 708.

Figure 10:
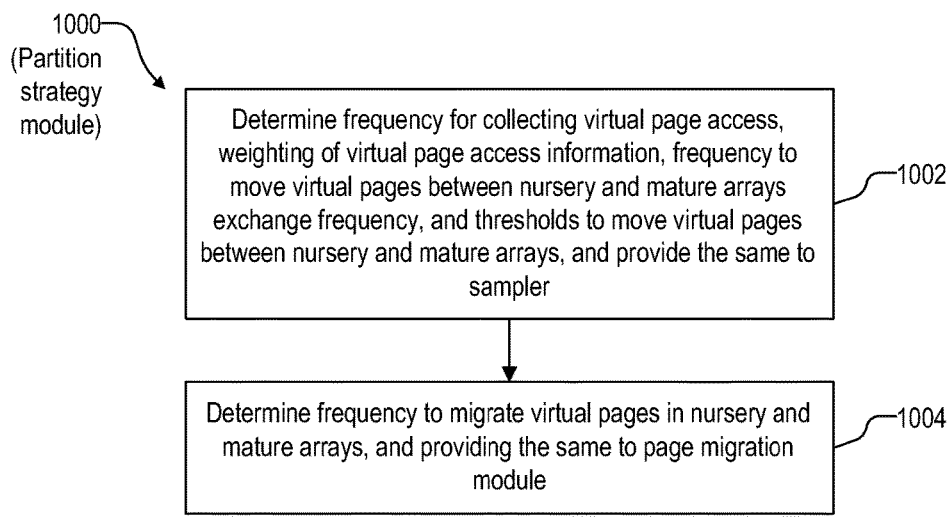
FIG. 10 is a flowchart of a method performed by a partition strategy module in the computing system of FIG. 7 in the caching technique of FIG. 1 according to at least some examples of the present disclosure.

FIG. 10 is a flowchart of a method 1000 implemented by partition strategy module 708 according to at least some examples of the present disclosure. The partition strategy module 708 may be implemented in software or other computer-readable instructions stored on a tangible non-transitory computer-readable storage medium and executable by one or more processors, in hardware, or in a combination of hardware and such computer-readable instructions. Method 1000 may begin in block 1002.

In block 1002, partition strategy module 708 may determine how frequently to record virtual page access to nursery array 116 and mature array 118 (e.g., every n times of a LLC access), any weighting to be applied to the virtual page access information, how frequently to move hot and cold virtual pages between nursery array 116 and mature array 118, thresholds to move hot and cold virtual pages between nursery array 116 and mature array 118, and/or other determination(s). Partition strategy module 708 may provide this information to a sampler 714 in a page migratory 712 at the hardware level. Block 1002 may be followed by block 1004.

In block 1004, partition strategy module 708 may also determine how frequently to migrate hot and cold virtual pages between cache regions. Partition strategy module 708 may provide this information to page migration module 706.

Figure 11:
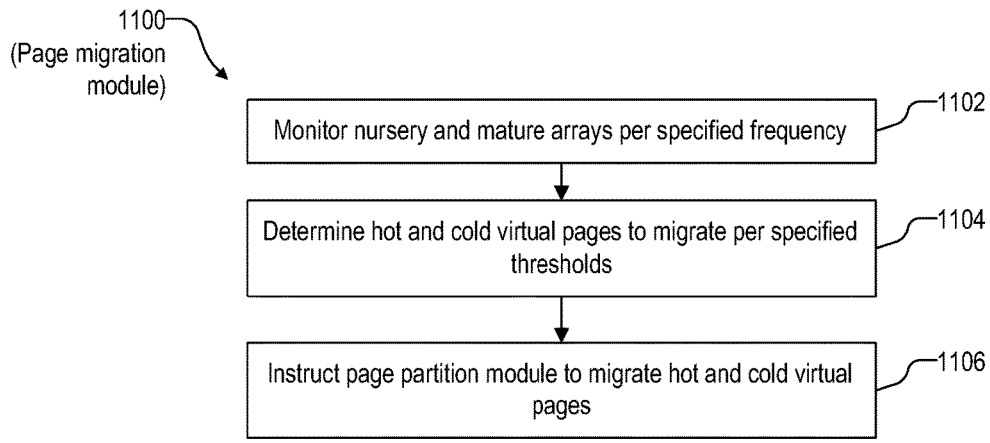
FIG. 11 is a flowchart of a method performed by a page migration module in the computing system of FIG. 7 in the caching technique of FIG. 1 according to at least some examples of the present disclosure.

FIG. 11 is a flowchart of a method 1100 implemented by page migration module 706 according to at least some examples of the present disclosure. The by page migration module 706 may be implemented in software or other computer-readable instructions stored on a tangible non-transitory computer-readable storage medium and executable by one or more processors, in hardware, or in a combination of hardware and such computer-readable instructions. Method 1100 may begin in block 1102.

In block 1102, page migration module 706 may monitor nursery array 116 and mature array 118 per a specified frequency. Block 1102 may be followed by block 1104.

In block 1104, page migration module 706 may determine hot and cold virtual pages to migrate between cache regions based on specified thresholds. For example, a hot virtual page in mature array 118 is to be migrated to fast cache region 112 when it is currently mapped to slow cache region 110 and its access pattern is greater than a specified threshold. Similarly, a cold virtual page in nursery array 116 is to be migrated to slow cache region 110 when it is currently mapped to fast cache region 112 and its access pattern is less than a specified threshold.

Page migration module 706 may access linked lists 114-1 to 114-2$^N$ maintained by a page partition module 710 in the OS level to determine free physical pages that are available to be remapped to these hot and cold virtual pages. If multiple free physical pages are available from linked lists 114-1 to 114-2$^N$, the OS may use a round-robin scheduling to select a free physical page in order to distribute the cold virtual pages among the available colors. If a free physical page is not available for a hot or cold virtual page, the OS may swap physical pages and cached data with another virtual page based on a replacement policy. Block 1104 may be followed by block 1106.

In block 1106, page migration module 706 may instruct page partition module 710 to remap the hot and cold virtual pages to the new physical pages identified in block 1104.

Figure 12:
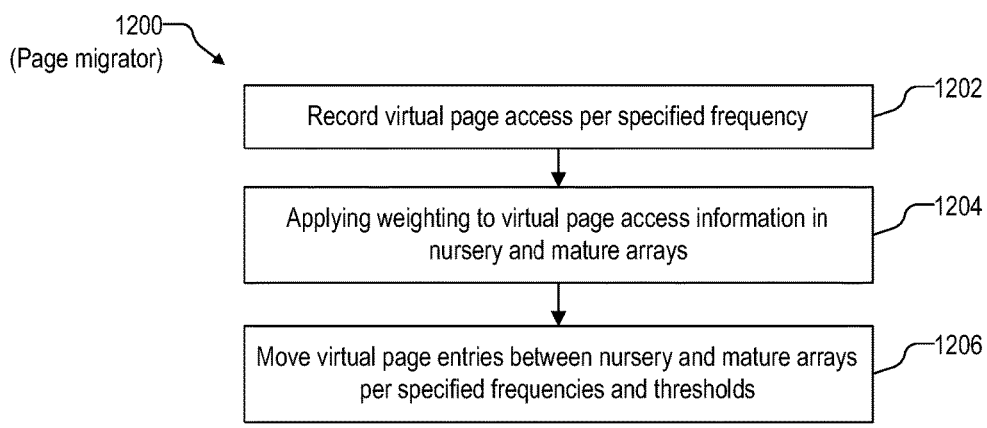
FIG. 12 is a flowchart of a method performed by a page migrator in the computing system of FIG. 7 in the caching technique of FIG. 1 according to at least some examples of the present disclosure.

FIG. 12 is a flowchart of a method 1200 implemented by sampler 714 of page migrator 712 in at least some examples of the present disclosure. The various components of page migrator 712 may be implemented in software or other computer-readable instructions stored on a tangible non-transitory computer-readable storage medium and executable by one or more processors, in hardware, or in a combination of hardware and such computer-readable instructions. Method 1200 may begin in block 1202.

In block 1202, sampler 714 may record virtual page access from mixed cache 102 at a specified frequency. For example, sampler 714 may record every $n^{th}$ access from mixed cache 102 (FIG. 1). Sampler 714 may include a counter that tracks the number of times mixed cache 102 is accessed, which resets after every $n^{th}$ access. Block 1202 may be followed by block 1204.

In block 1204, sampler 714 may apply weighting, if any, to the virtual page access information per the specified weights for reads and writes. Block 1204 may be followed by block 1206.

In block 1206, sampler 714 may move virtual page entries between nursery array 116 and mature array 118 based on the specified thresholds and the specified frequencies.

Figure 13:
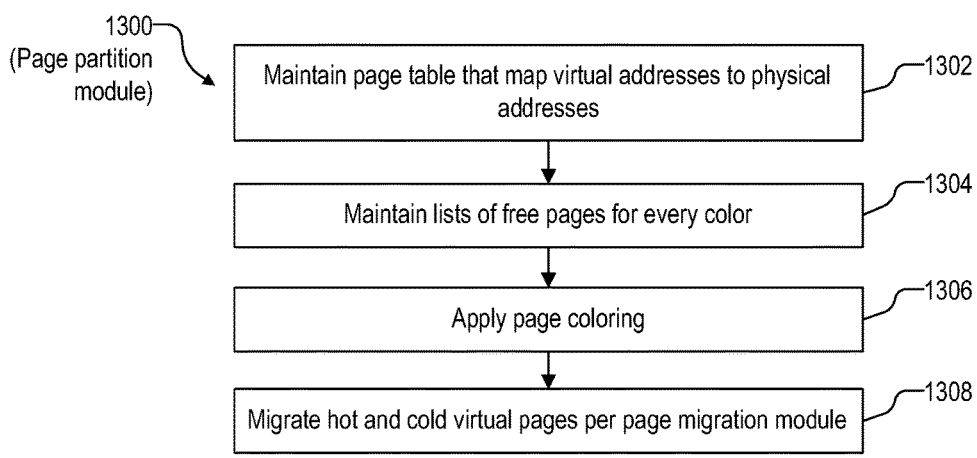
FIG. 13 is a flowchart of a method performed by a page partition module in the computing system of FIG. 7 in the caching technique of FIG. 1 according to at least some examples of the present disclosure.

FIG. 13 is a flowchart of a method 1300 implemented by page partition module 710 according to at least some examples of the present disclosure. The page partition module 710 may be implemented in software or other computer-readable instructions stored on a tangible non-transitory computer-readable storage medium and executable by one or more processors, in hardware, or in a combination of hardware and such computer-readable instructions. Method 1300 may begin in block 1302.

In block 1302, page partition module 710 may maintain the page tables that map virtual addresses to physical addresses. Block 1302 may be followed by block 1304.

In block 1304, page partition module 710 may maintain linked lists 114-1 to 114-2$^N$ of free physical pages of every color. Block 1304 may be followed by block 1306.

In block 1306, page partition module 710 may apply page coloring in allocating physical pages to virtual pages. When allocating free physical pages from lists 114-1 to 114-2$^N$, page partition module 710 may use a round-robin scheduling to help ensure that virtual pages are distributed among the available colors.

In block 1308, page partition module 710 may migrate virtual pages between slow cache region 110 and fast cache region 112 by remapping them to new physical pages as instructed by page migration module 706 in accordance with method 1100.

Figure 14:
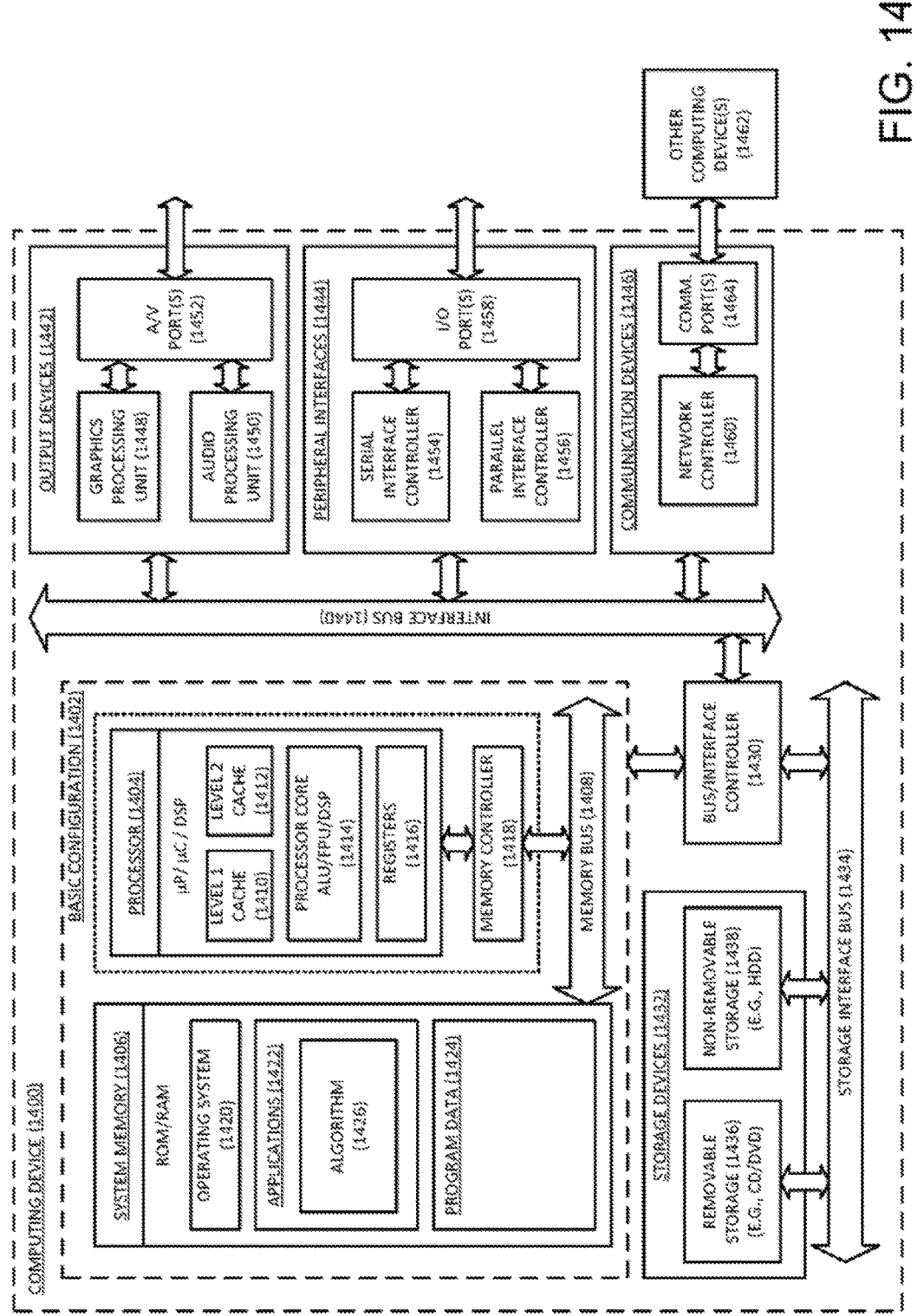
FIG. 14 shows is a block diagram illustrating a computing device to implement the caching technique of FIG. 1 in at least some examples of the present disclosure.

FIG. 14 is a block diagram of an example computing device 1400 configured to use page coloring with nursery array 116 and mature array 118 to migrate virtual pages from one cache region to another cache region according to at least some examples of the present disclosure. In a basic configuration, computing device 1400 typically includes one or more host processors 1404 and a system memory 1406. A memory bus 1408 may be used for communicating between host processor 1404 and system memory 1406.

Depending on the particular configuration, host processor 1404 may be of any type including but not limited to a microprocessor (µP), a microcontroller (µC), a digital signal processor (DSP), or any combination thereof. Host processor 1404 may include one or more levels of caching, such as a L1 cache 1410 and a L2 cache 1412, a processor core 1414, and registers 1416. An example processor core 1414 may include an arithmetic logic unit (ALU), a floating point unit (FPU), a digital signal processing core (DSP core), or any combination thereof. An example memory controller 1418 may also be used with host processor 1404, or in some implementations, memory controller 1418 may be an internal part of host processor 1404.

Depending on the particular configuration, system memory 1406 may be of any type including but not limited to volatile memory (such as RAM), non-volatile memory (such as ROM, flash memory, etc.), or any combination thereof. System memory 1406 may include an operating system 1420, one or more applications 1422, and program data 1424. Operating system 1420 may include strategy module 704, page migration module 706, partition strategy module 708, and page partition module 710 (FIG. 7). Application 1422 may include an algorithm 1426 that can be arranged to perform the operations of partition target module 702 (FIG. 7). Program data 1424 may include parameters associated with algorithm 1426. In some embodiments, application 1422 may be arranged to operate with program data 1424 on operating system 1420 such that the various methods may be performed as described herein. This described basic configuration 1402 is illustrated in FIG. 14 by those components within the inner dashed line.

Computing device 1400 may have additional features or functionality, and additional interfaces to facilitate communications between basic configuration 1402 and any required devices and interfaces. For example, a bus/interface controller 1430 may be used to facilitate communications between basic configuration 1402 and one or more data storage devices 1432 via a storage interface bus 1434. Data storage devices 1432 may be removable storage devices 1436, non-removable storage devices 1438, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile (non-transitory), removable and non-removable media implemented in any method or technology for storage of information, such as computer readable instructions, data structures, program modules, or other data.

System memory 1406, removable storage devices 1436, and non-removable storage devices 1438 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1400. Any such computer storage media may be part of computing device 1400.

Computing device 1400 may also include an interface bus 1440 for facilitating communication from various interface devices (e.g., output devices 1442, peripheral interfaces 1444, and communication devices 1446) to basic configuration 1402 via bus/interface controller 1430. Example output devices 1442 include a graphics processing unit 1448 and an audio processing unit 1450, which may be configured to communicate to various external devices such as a display or speakers via one or more A/V ports 1452. Example peripheral interfaces 1444 include a serial interface controller 1454 or a parallel interface controller 1456, which may be configured to communicate with external devices such as input devices (e.g., keyboard, mouse, pen, voice input device, touch input device, etc.) or other peripheral devices (e.g., printer, scanner, etc.) via one or more I/O ports 1458. An example communication device 1446 includes a network controller 1460, which may be arranged to facilitate communications with one or more other computing devices 1462 over a network communication link via one or more communication ports 1464. In some implementations, other computing devices 1462 include a multi-core processor, which may communicate with the host processor 1404 through the interface bus 1440.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the particular vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware is possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link and/or channel, a wireless communication link and/or channel, etc.).

The devices and/or processes are described in the manner set forth herein, and thereafter engineering practices may be used to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The subject matter described herein sometimes illustrates different components contained within, or connected with, different other components. Such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, the terms may be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense generally understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense generally understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments are possible. The various aspects and embodiments disclosed herein are for purposes of illustration and are not intended to be limiting, with the true scope and spirit being indicated by the following claims.

We claim:

1. A method for a computing system to migrate virtual pages between cache regions of different memory types in a mixed cache, the mixed cache being indexed to a main memory comprising physical pages so that each physical page in the main memory is mapped to one group of contiguous cache sets in the mixed cache, a nursery array and a mature array being indexed to a virtual memory comprising virtual pages so that each virtual page is mapped to one row in the nursery array and one row in the mature array, the method comprising:

applying page coloring to map the virtual memory to the main memory so that physical pages mapped to different groups of contiguous cache sets are assigned to adjacent virtual pages; and recording access to a particular virtual page of the virtual memory from the mixed cache, wherein recording comprises:

receiving a virtual address for the particular virtual page;

from the received virtual address, determining an index and a tag of an array address to the nursery array and the mature array;

following the determined index of the array address to a row in the nursery array and a row in the mature array, wherein the row in the nursery array and the row in the mature array comprises virtual page entries;

determining whether or not the determined tag of the array address matches any tag in the virtual page entries of the row in the nursery array and the row in the mature array;

in response to a non-match between the determined tag of the array address and any tag in the virtual page entries of the row in the nursery array and the row in the mature array, writing a virtual page entry of the row in the nursery array with the determined tag of the array address and an access count; and in response to a match between the determined tag of the array address and the tag in the virtual page entry, incrementing the access count in the virtual page entry that corresponds to the matched tags.

2. The method of claim 1, wherein writing the virtual page entry of the row in the nursery array with the determined tag of the array address and incrementing the access count in the virtual page entry comprises, in response to the row in the nursery array being full, selecting the virtual page entry based on a replacement policy and writing over data in the virtual page entry.

3. The method of claim 1, wherein the mixed cache is a last level cache, every $n^{th}$ access from the mixed cache is recorded, and wherein n is greater than or equal to 1.

4. The method of claim 1, further comprising:

moving the virtual page entry from the nursery array to the mature array, wherein moving comprises:

determining whether or not an access pattern of the particular virtual page is greater than a first threshold based on the access count in the virtual page entry in the nursery array; and in response to the access pattern of the particular virtual page being greater than the first threshold, moving the virtual page entry from the row in the nursery array to the row in the mature array.

5. The method of claim 4, wherein moving the virtual page entry from the row in the nursery array to the row in the mature array comprises, in response to the row in the mature array being full, selecting another virtual page entry from the row in the mature array based on a replacement policy and swapping the virtual page entry from the row in the nursery array with the selected another virtual page entry from the row in the mature array.

6. The method of claim 4, further comprising:

migrating the particular virtual page from being mapped to a first cached region in the mixed cache to being mapped to a second cache region in the mixed cache, wherein migrating comprises:

determining whether or not the access pattern of the particular virtual page is greater than a second threshold based on the access count in the virtual page entry from the row in the mature array; and in response to the access pattern of the virtual page being greater than the second threshold, remapping the particular virtual page from a first physical page of the main memory that is mapped to the first cache region to a second physical page of the main memory that is mapped to the second cache region.

7. The method of claim 6, wherein remapping the particular virtual page from the first physical page mapped to the first cache region to the second physical page mapped to the second cache region comprises:

selecting a free physical page or an allocated physical page of the main memory having a different hybrid bit in its physical address so that underlying cache sets are located in the second cache region; and migrating data from first cache sets that correspond to the first physical page to second cache sets that correspond to the second physical page.

8. The method of claim 7, wherein:

selecting the free physical page comprises selecting the free physical page from a linked list of free physical pages from linked lists of free physical pages of different colors based on a round-robin scheduling, and selecting the allocated physical page is based on a replacement policy.

9. The method of claim 6, further comprising:

moving the virtual page entry from the mature array to the nursery array, comprising:

determining whether or not the access pattern of the particular virtual page is less than a third threshold based on the access count in the virtual page entry in the mature array; and in response to the access pattern of the virtual page being less than the third threshold, moving the virtual page entry from the row in the mature array to the row in the nursery array.

10. The method of claim 9, wherein moving the virtual page entry from the row in the mature array to the row in the nursery array comprises, in response to the row in the nursery array being full, selecting another virtual page entry from the row in the nursery array based on a replacement policy and swapping the virtual page entry from the row in the mature array with the selected another virtual page entry from the row in the nursery array.

11. The method of claim 9, further comprising:

migrating the particular virtual page from being mapped to the second cached region to being mapped to the first cache region, comprising:

determining whether or not the access pattern of the particular virtual page is less than a fourth threshold based on the access count in the virtual page entry in the nursery array; and in response to the access pattern of the virtual page being less than the fourth threshold, remapping the particular virtual page from the second physical page mapped to the second cache region to a third physical page mapped to the first cache region.

12. The method of claim 11, wherein remapping the particular virtual page from the second physical page mapped to the second cache region to the third physical page mapped to the first cache region comprises:
   selecting a free physical page or an allocated physical page of the main memory having a different hybrid bit in its physical address so that underlying cache sets are located in the first cache region; and
   migrating data from second cache sets that correspond to the second physical page to third cache sets that correspond to the third physical page.

13. The method of claim 12, wherein:
   selecting the free physical page comprises selecting the free physical page from a link list of free physical pages from linked lists of free physical pages of different colors based on a round-robin scheduling, and
   selecting the allocated physical page is based on a replacement policy.

14. The method of claim 10, wherein the access count comprises a read count, a write count, or a read-write ratio.

15. A computing system, comprising:
   a processor;
   a mixed cache coupled to the processor and comprising a first cache region and a second cache region of different memory types, wherein the mixed cache is indexed to a main memory that comprises physical pages so that one group of contiguous cache sets in the mixed cache is mapped to a physical page of the main memory;
   a nursery array and a mature array indexed to a virtual memory that comprises virtual pages so that each virtual page of the virtual memory is mapped to one row in the nursery array and one row in the mature array,
   wherein the processor is configured to control operation of:
      a page partition module to implement page coloring to map the virtual memory to the main memory so that physical pages mapped to different groups of contiguous cache sets are assigned to adjacent virtual pages;
      a sampler to record access to a particular virtual page from the mixed cache, wherein the sampler is configured to:
         receive a virtual address for the particular virtual page;
         from the received virtual address, determine an index and a tag of an array address to the nursery array and the mature array;
         follow the determined index of the array address to a row in the nursery array and a row in the mature array, wherein the row in the nursery array and the row in the mature array comprise virtual page entries;
         determine whether or not the determined tag of the array address matches any tag in the virtual page entries of the row in the nursery array and the row in the mature array;
         in response to a non-match between the determined tag of the array address and any tag in the virtual page entries of the row in the nursery array and the row in the mature array, write a virtual page entry of the row in the nursery array with the determined tag of the array address and an access count; and
         in response to a match between the determined tag of the array address and the tag in the virtual page entry, increment the access count in the virtual page entry that corresponds to the matched tags.

16. The computing system of claim 15, wherein the mixed cache includes a last level cache, wherein the sampler is configured to record every $n^{th}$ access from the mixed cache, and wherein n is greater than or equal to 1.

17. The computing system of claim 15, wherein the sampler is configured to:
   move the virtual page entry from the nursery array to the mature array, wherein to move the virtual page entry, the sampler is configured to:
      determine whether or not an access pattern of the particular virtual page is greater than a first threshold based on the access count in the virtual page entry in the nursery array; and
      in response to the access pattern of the particular virtual page being greater than the first threshold, move the virtual page entry from the row in the nursery array to the row in the mature array.

18. The computing system of claim 17, wherein the processor is configured to control operation of:
   a page migration module to migrate the particular virtual page from being mapped to a first cached region in the mixed cache to being mapped to a second cache region in the mixed cache, wherein the page migration module is configured to:
      determine whether or not the access pattern of the particular virtual page is greater than a second threshold based on the access count in the virtual page entry in the mature array; and
      in response to the access pattern of the virtual page being greater than the second threshold, remap the particular virtual page from a first physical page of the main memory that is mapped to the first cache region to a second physical page of the main memory that is mapped to the second cache region.

19. The computing system of claim 18, wherein to remap the virtual page from a first physical page mapped to the first cache region to a second physical page mapped to the second cache region, the sampler is configured to:
   select a free physical page or an allocated physical page of the main memory having a different hybrid bit in its physical address so that underlying cache sets are located in the second cache region; and
   migrate data from first cache sets that correspond to the first physical page to second cache sets that correspond to the second physical page.

20. The computing system of claim 18, wherein the sampler is configured to:
   move the virtual page entry from the mature array to the nursery array, wherein to move the virtual page entry, the sampler is configured to:
      determine whether or not the access pattern of the particular virtual page is less than a third threshold based on the access count in the virtual page entry in the mature array; and
      in response to the access pattern of the virtual page being less than the third threshold, move the virtual page entry from the row in the mature array to the row in the nursery array.

21. The computing system of claim 20, wherein the page migration module is configured to:
   migrate the particular virtual page from being mapped to the second cached region to being mapped to the first cache region, wherein to migrate the virtual page, the page migration module is configured to:

determine whether or not the access pattern of the virtual page is less than a fourth threshold based on the access count in the virtual page entry in the nursery array; and in response to the access pattern of the virtual page being less than the fourth threshold, remap the virtual page from the second physical page mapped to the second cache region to a third physical page mapped to the first cache region.

22. The computing system of claim 21, wherein the processor is configured to control operation of:

one or more modules to receive a performance target and convert the performance target into:

the first threshold, the second threshold, the third threshold, and the fourth threshold, wherein each of the first threshold, the second threshold, the third threshold, and the fourth threshold comprise a read count, a write count, or a read-write ratio; and frequencies to store accesses to virtual pages in the nursery array and the mature array, to move virtual page entries between the nursery array and the mature array, and to migrate virtual pages between the first cache region and the second cache region.

23. A non-transitory computer-readable storage medium encoded with instructions executable by a processor to:

apply page coloring to map a virtual memory that comprises virtual pages to a main memory comprising physical pages so that physical pages mapped to different groups of contiguous cache sets in a mixed cache are assigned to adjacent virtual pages, wherein the mixed cache is indexed to the main memory so that each physical page in the main memory is mapped to one group of contiguous cache sets in the mixed cache; and record access to a particular virtual page of the virtual memory from the mixed cache, comprising to:

receive a virtual address for the particular virtual page;

from the received virtual address, determine an index and a tag of an array address to a nursery array and a mature array, wherein the nursery array and the mature array are indexed to the virtual memory so each virtual page is mapped to one row in the nursery array and one row in the mature array;

follow the determined index of the array address to a row in the nursery array and a row in the mature array, wherein the row in the nursery array and the row in the mature array comprise virtual page entries;

determine whether or not the determined tag of the array address matches any tag in the virtual page entries of the row in the nursery array and the row in the mature array;

in response to a non-match between the determined tag of the array address and any tag in the virtual page entries of the row in the nursery array and the row in the mature array, write a virtual page entry of the row in the nursery array with the determined tag of the array address and an access count; and in response to a match between the determined tag of the array address and the tag in the virtual page entry, increment the access count in the virtual page entry corresponding to the matched tags.

24. The non-transitory computer-readable storage medium of claim 23, wherein the mixed cache is a last level cache, every $n^{th}$ access from the mixed cache is recorded, and wherein n is greater than or equal to 1.

25. The non-transitory computer-readable storage medium of claim 23, wherein the instructions further include instructions executable by the processor to:

move the virtual page entry from the nursery array to the mature array, comprising to:

determine whether or not an access pattern of the particular virtual page is greater than a first threshold based on the access count in the virtual page entry in the nursery array; and in response to the access pattern of the particular virtual page being greater than the first threshold, move the virtual page entry from the row in the nursery array to the row in the mature array.

26. The non-transitory computer-readable storage medium of claim 25, wherein the instructions further include instructions executable by the processor to:

migrate the particular virtual page from being mapped to a first cached region in the mixed cache to being mapped to a second cache region in the mixed cache, comprising to:

determine whether or not the access pattern of the particular virtual page is greater than a second threshold based on the access count in the virtual page entry from the row in the mature array; and in response to the access pattern of the virtual page being greater than the second threshold, remap the particular virtual page from a first physical page of the main memory that is mapped to the first cache region to a second physical page of the main memory that is mapped to the second cache region.

27. The non-transitory computer-readable storage medium of claim 26, wherein the instructions further include instructions executable by the processor to:

move the virtual page entry from the mature array to the nursery array, comprising to:

determine whether or not the access pattern of the particular virtual page is less than a third threshold based on the access count in the virtual page entry in the mature array; and in response to the access pattern of the virtual page being less than the third threshold, move the virtual page entry from the row in the mature array to the row in the nursery array.

28. The non-transitory computer-readable storage medium of claim 27, wherein the instructions further include instructions executable by the processor to:

migrate the particular virtual page from being mapped to the second cached region to being mapped to the first cache region, comprising to:

determine whether or not the access pattern of the particular virtual page is less than a fourth threshold based on the access count in the virtual page entry in the nursery array; and in response to the access pattern of the virtual page being less than the fourth threshold, remap the particular virtual page from the second physical page mapped to the second cache region to a third physical page mapped to the first cache region.

* * * * *